(12) United States Patent
Van den Bergh (10) Patent No.: US 8,892,385 B2
(45) Date of Patent: Nov. 18, 2014

(54) SYSTEM AND METHOD FOR USE WITH AN ACCELEROMETER TO DETERMINE A FRAME OF REFERENCE

(71) Applicant: Scope Technologies Holdings Limited, Road Town (VG)

(72) Inventor: Johann Van den Bergh, Johannesburg (ZA)

(73) Assignee: Scope Technologies Holdings Limited, Road Town (VG)

( * ) Notice: Subject to any disclaimer, the term of this patent is extended or adjusted under 35 U.S.C. 154(b) by 10 days.

(21) Appl. No.: 13/679,749

(22) Filed: Nov. 16, 2012

(65) Prior Publication Data

US 2013/0166099 A1    Jun. 27, 2013

Related U.S. Application Data

(60) Provisional application No. 61/578,511, filed on Dec. 21, 2011, provisional application No. 61/616,722, filed on Mar. 28, 2012.

(51) Int. Cl.
| | |
|---|---|
| G01P 21/00 | (2006.01) |
| G01P 15/18 | (2013.01) |
| G06F 17/00 | (2006.01) |
| B60W 40/09 | (2012.01) |
| G01P 15/00 | (2006.01) |

(52) U.S. Cl.
CPC .............. G06F 17/00 (2013.01); G01P 21/00 (2013.01); B60W 40/09 (2013.01); *G01P 15/005* (2013.01); *G01P 15/18* (2013.01)
USPC .......................................... 702/104; 702/141

(58) Field of Classification Search
CPC ............................. G01P 15/005; G01P 15/18
See application file for complete search history.

(56) References Cited

U.S. PATENT DOCUMENTS

| | | | |
|---|---|---|---|
| 4,758,959 A | 7/1988 | Thoonbe et al. | |
| 6,282,496 B1 | 8/2001 | Chowdhary | |
| 7,643,960 B2 * | 1/2010 | Tan et al. ...................... | 702/141 |
| 7,653,507 B2 * | 1/2010 | Yamada et al. ............... | 702/141 |
| 7,715,961 B1 | 5/2010 | Kargupta | |

(Continued)

FOREIGN PATENT DOCUMENTS

WO    WO2011003461 A1 *    1/2011    ............. G01C 21/16

OTHER PUBLICATIONS

International Searching Authority, International Search Report and Written Opinion for PCT International Application No. PCT/US2012/071487, Apr. 19, 2013, 14 pages.

*Primary Examiner* — John R Olszewski
*Assistant Examiner* — Todd Melton
(74) *Attorney, Agent, or Firm* — Clayton R. Morlock (57) ABSTRACT

A system and method for use with a device that includes an accelerometer, which can be used to determine a frame of reference for the device relative to a moving vehicle or other equipment, and which can be subsequently used in assessing or monitoring the status of the vehicle or an operator thereof. In accordance with an embodiment, by sampling accelerometer data over a period of time, the system can determine a rotation matrix or skew between the device/accelerometer's orientation and understanding of direction, and the vehicle's true orientation or direction in three-dimensions. The information can be used to provide corrections to the accelerometer data, and to more accurately determine the vehicle's true orientation/direction and motion within a three-dimensional frame of reference.

13 Claims, 8 Drawing Sheets

(56) References Cited

U.S. PATENT DOCUMENTS

| | | |
|---|---|---|
| 8,065,104 B2 * | 11/2011 | Fiedler et al. ............... 702/95 |
| 2002/0111725 A1 | 8/2002 | Burge |
| 2004/0153362 A1 | 8/2004 | Bauer |
| 2005/0131597 A1 | 6/2005 | Raz et al. |
| 2007/0159309 A1 | 7/2007 | Ito et al. |
| 2009/0210257 A1 | 8/2009 | Chalfant et al. |
| 2010/0063850 A1 | 3/2010 | Daniel |
| 2010/0131304 A1 | 5/2010 | Collopy et al. |
| 2010/0299017 A1 | 11/2010 | Hansen et al. |
| 2010/0305805 A1 | 12/2010 | Yamaguchi |
| 2011/0106370 A1 | 5/2011 | Duddle et al. |
| 2011/0202305 A1 * | 8/2011 | Willis et al. ............... 702/141 |
| 2011/0307188 A1 | 12/2011 | Peng et al. |
| 2011/0313650 A1 * | 12/2011 | Tome ............... 701/200 |
| 2012/0123806 A1 | 5/2012 | Schumann, Jr. et al. |
| 2012/0166035 A1 | 6/2012 | Boss et al. |
| 2013/0040599 A1 | 2/2013 | Berg et al. |
| 2013/0041521 A1 | 2/2013 | Basir |
| 2013/0060583 A1 | 3/2013 | Collins et al. |
| 2013/0144474 A1 | 6/2013 | Ricci |

* cited by examiner

SYSTEM AND METHOD FOR USE WITH AN ACCELEROMETER TO DETERMINE A FRAME OF REFERENCE

CLAIM OF PRIORITY

This application claims the benefit of priority to U.S. Provisional Patent Application titled "SYSTEM AND METHOD FOR USE OF PATTERN RECOGNITION IN ASSESSING OR MONITORING VEHICLE STATUS OR OPERATOR DRIVING BEHAVIOR", Application No. 61/578,511, filed Dec. 21, 2011; and U.S. Provisional Patent Application titled "SYSTEM AND METHOD FOR USE WITH AN ACCELEROMETER TO DETERMINE A FRAME OF REFERENCE"; Application No. 61/616,722, filed Mar. 28, 2012; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to telematics and related technologies, and are particularly related to a system and method for use with an accelerometer to determine a frame of reference, for subsequent use in assessing or monitoring a status of a vehicle, piece of equipment, or operator thereof.

BACKGROUND

Telematics generally refers to the integration of telecommunications and informatics, and is often described in the context of sending and receiving information about moving objects by means of telecommunication devices. A well-known use of telematics is in regard to vehicles, and with control of moving vehicles, such as haulage trucks. Telematics are of particular use in industries such as fleet management, which might also include tracking the location and operation of ships, trains, planes, containers, and other equipment.

Devices such as Global Positioning Systems (GPS) can be used to provide additional information beyond that provided by the vehicle itself. Accelerometers are also sometimes used to determine vectors of acceleration or the change in speed of a particular, e.g. vehicle or other equipment. However, a problem arises when the accelerometer is not properly aligned with, or calibrated against a true dimension, such as the true forward direction of a vehicle, since the measurements obtained may not accurately reflect the operation of the vehicle. Compensating for such discrepancies can be complex, requiring computationally expensive calculations of angle cosines, and the resultant accelerometers can be difficult to install and maintain, and in some instances it may not be possible to mathematically compensate for the discrepancies. This is the general area that embodiments of the invention are intended to address.

SUMMARY

Described herein is a system and method for use with a device that includes an accelerometer, which can be used to determine a frame of reference for the device relative to a moving vehicle or other equipment, and which can be subsequently used in assessing or monitoring the status of the vehicle or an operator thereof. In accordance with an embodiment, by sampling accelerometer data over a period of time, the system can determine a rotation matrix or skew between the device/accelerometer's orientation and understanding of direction, and the vehicle's true orientation or direction in three-dimensions. The information can be used to provide corrections to the accelerometer data, and to more accurately determine the vehicle's true orientation/direction and motion within a three-dimensional frame of reference.

DETAILED DESCRIPTION

As described above, in the field of telematics, a problem arises when accelerometers are used but are not properly aligned with, or calibrated against a true dimension, such as the true forward direction of a vehicle, since the measurements obtained may not truly reflect the operation of the vehicle.

Accordingly, described herein is a system and method for use with a device that includes an accelerometer, which can be used to determine a frame of reference for the device relative to a moving vehicle or other equipment, and which can be subsequently used in assessing or monitoring the status of the vehicle or an operator thereof.

In accordance with an embodiment, the system can be provided as a small device which in turn can be mounted to e.g., the interior of a vehicle, and which includes one or more accelerometers. Since a vehicle generally travels in a horizontal plane, by sampling accelerometer data over a period of time, and also referring to information from one or more other on-board devices, such as a GPS, gyroscope or additional accelerometer, the system can first determine where the vehicle is "on the plane", i.e. determine the vehicle's true x-y plane inasmuch as it differs from the device/accelerometer's orientation and understanding of the plane. Given the knowledge of the x-y plane, the vehicle's z-axis can be readily determined in that the z-axis is perpendicular to the x-y plane. Next, to determine the vehicle's x-axis, data from the accelerometer, optionally in combination with the information from the other on-board devices, is used to determine the vehicle's forward direction. In accordance with an embodiment, since a vehicle's most prevalent acceleration is in a forward direction (while in contrast its most prevalent deceleration is in the opposite direction), a vehicle's instances of braking provides a particularly discernible change in acceleration/deceleration. By averaging the accelerometer data over several braking instances, the system can determine the vehicle's forward motion along a y-axis. Given the knowledge of the y-axis, the vehicle's x-axis can be readily determined in that it lies within the x-y plane, perpendicular to the y-axis (in other words, mutually perpendicular to both the y and z axes).

The resultant determinations can be stored as a rotation matrix that reflects the skew, represented either in Cartesian or polar coordinates, between the device/accelerometer's orientation and understanding of direction, and the vehicle's true orientation or direction in three-dimensions. The information can be used to provide corrections to the accelerometer data, and to more accurately determine the vehicle's true orientation/direction and motion within a three-dimensional frame of reference.

Although the above approach can be employed to first determine the frame of reference's x-y plane, followed by its z-axis, y-axis, and lastly x-axis, it will be evident that, in accordance with other embodiments and approaches, the various axes can be determined in a different order, e.g., first the x-y plane, followed by the x-axis, and finally the y and z axes. The particular order is dependent on the particular desired implementation, but the net result (i.e., the determination of those axes that comprise the frame of reference) is otherwise the same.

Also, it will be evident that the above approach works only while the system is itself mounted to or otherwise fixed in position relative to the vehicle while the vehicle is moving. If, during use, the system was free to move relative to the vehicle, then it could not serve as an accurate frame of reference. However, in accordance with an embodiment, to account for occasional movement of the device, whenever a particular trip is finished, and subsequently a new trip is started at a later time, the system can be quickly reset and recalibrated using the above technique, to allow for occasions in which the system is removed from the vehicle between trips.

In accordance with an embodiment, information from the system regarding the motions of the vehicle in three dimensions can be used, for example, as an input to another system or process for determining operator behavior, such as that described in U.S. Provisional Patent Application titled "SYSTEM AND METHOD FOR USE OF PATTERN RECOGNITION IN ASSESSING OR MONITORING VEHICLE STATUS OR OPERATOR DRIVING BEHAVIOR", Application No. 61/578,511, filed Dec. 21, 2011, and herein incorporated by reference. As described therein, information about the vehicle's maneuvers can be used in combination with known operating patterns to determine or assess an operator's driving pattern.

Although the illustrations provided herein primarily describe embodiments using vehicles, it will be evident that the techniques described herein can be similarly used with, e.g., trains, ships, airplanes, containers, or other moving equipment. Additionally, the techniques described herein can be used in combination with other systems, such as those that use dead-reckoning techniques, to provide additional types of combined information.

Figure 1:
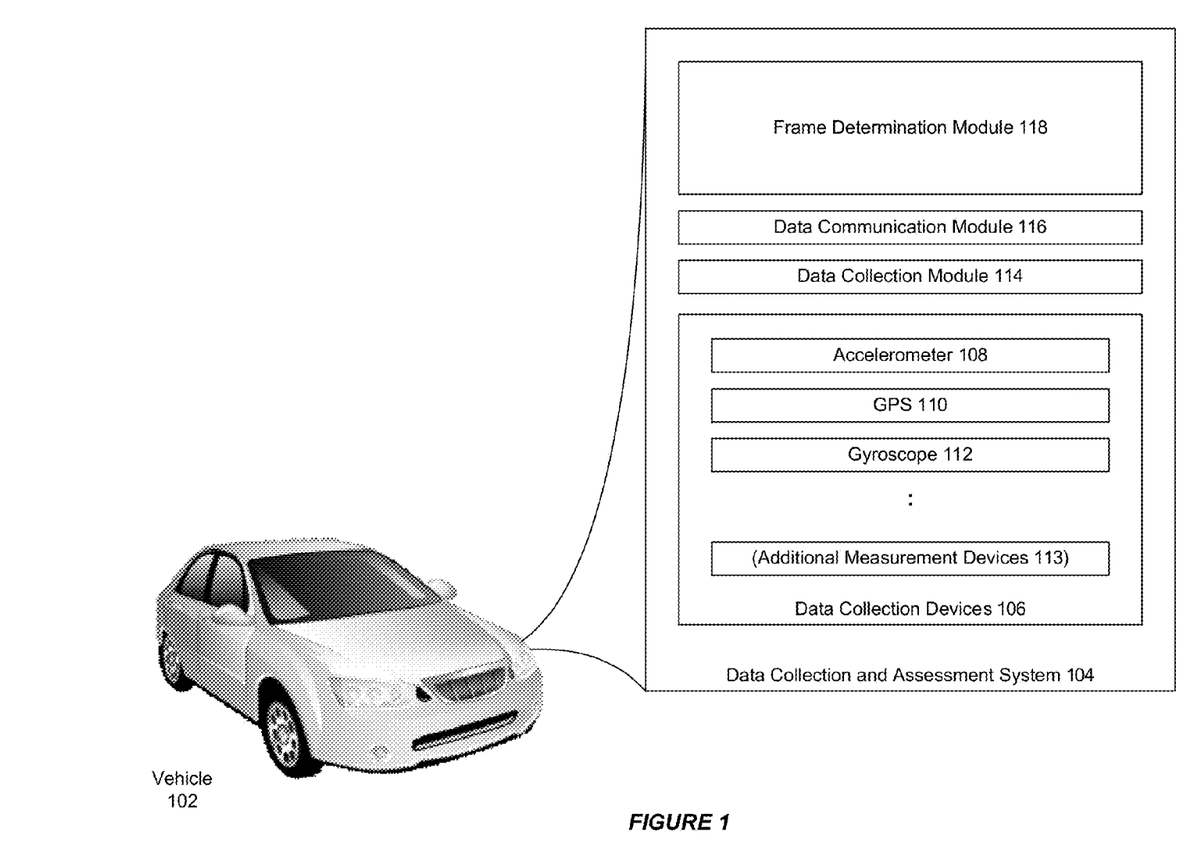
FIG. 1 illustrates a system for use with an accelerometer to determine a frame of reference, in accordance with an embodiment.

FIG. 1 illustrates a system for use with an accelerometer to determine a frame of reference, in accordance with an embodiment. As shown in FIG. 1, in accordance with an embodiment, a vehicle 102 can be equipped with a data collection and assessment system 104. The data collection and assessment system, which as described above can be provided as a small device mounted to the interior of a vehicle, comprises one or more data collection devices 106, including an accelerometer 108. Optionally other measurement devices, such as an on-board GPS 110, gyroscope 112, or additional measurement devices 113, can also be used to provide data or information about the vehicle's maneuvers. A data collection module 114 collects the data or information from the data collection devices, while a data communication module 116 enables communication of the collected data and information, such as through the use of telematics, to one or more other systems, such as an external system for assessing an operator's driving pattern. A frame determination module 118 samples or otherwise receives accelerometer data over a period of time, and also information from the one or more other on-board devices, and uses this information to determine the frame of reference.

Figure 2:
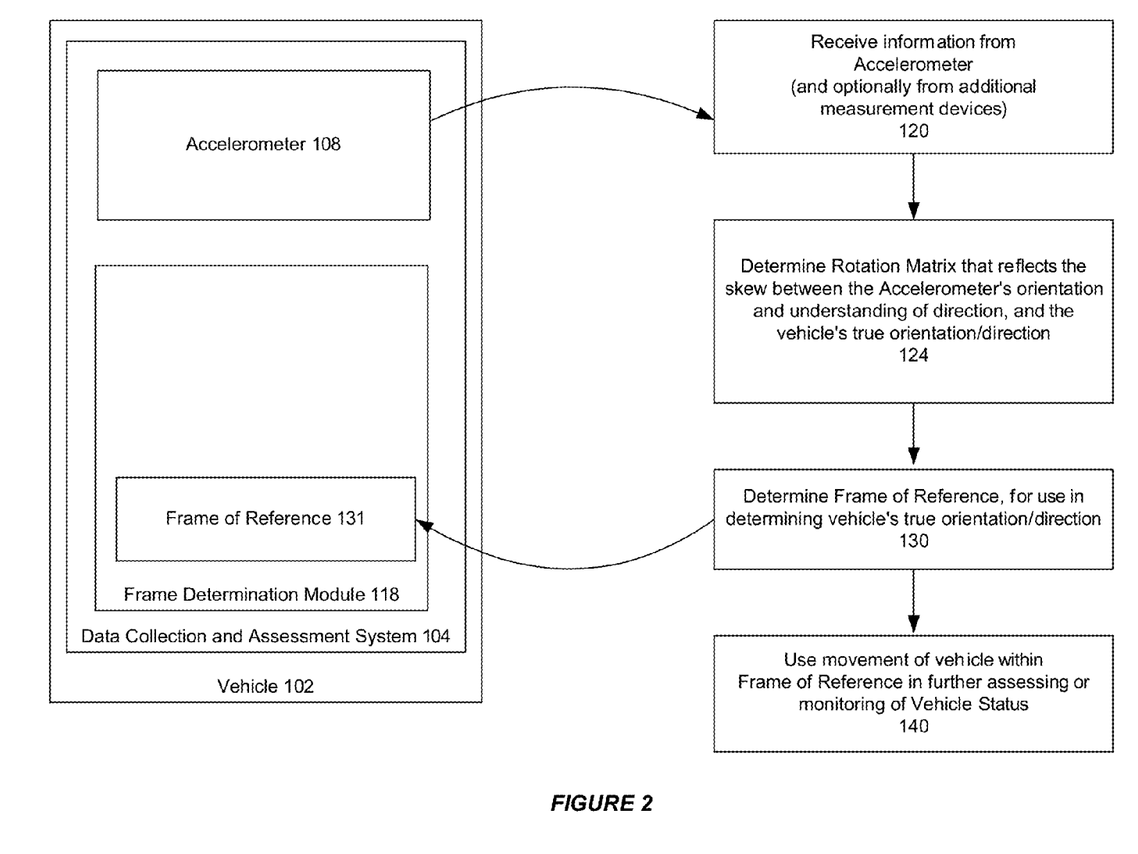
FIG. 2 illustrates a means for determining a frame of reference, in accordance with an embodiment.

FIG. 2 illustrates a means for determining a frame of reference, in accordance with an embodiment. As shown in FIG. 2, as the vehicle moves, the system receives data or information 120 from the accelerometer (and optionally from any additional measurement devices provided). This information is used by the frame of reference determination module to determine a rotation matrix or skew 124 between the device/accelerometer's orientation and understanding of direction, and the vehicle's true orientation or direction in three-dimensions, and to more accurately determine the vehicle's true orientation/direction and motion within a three-dimensional frame of reference 130. The movement of the vehicle within the frame of reference can be used, e.g., in combination with known operating patterns as described above, to determine or assess an operator's driving pattern 140.

Figure 3:
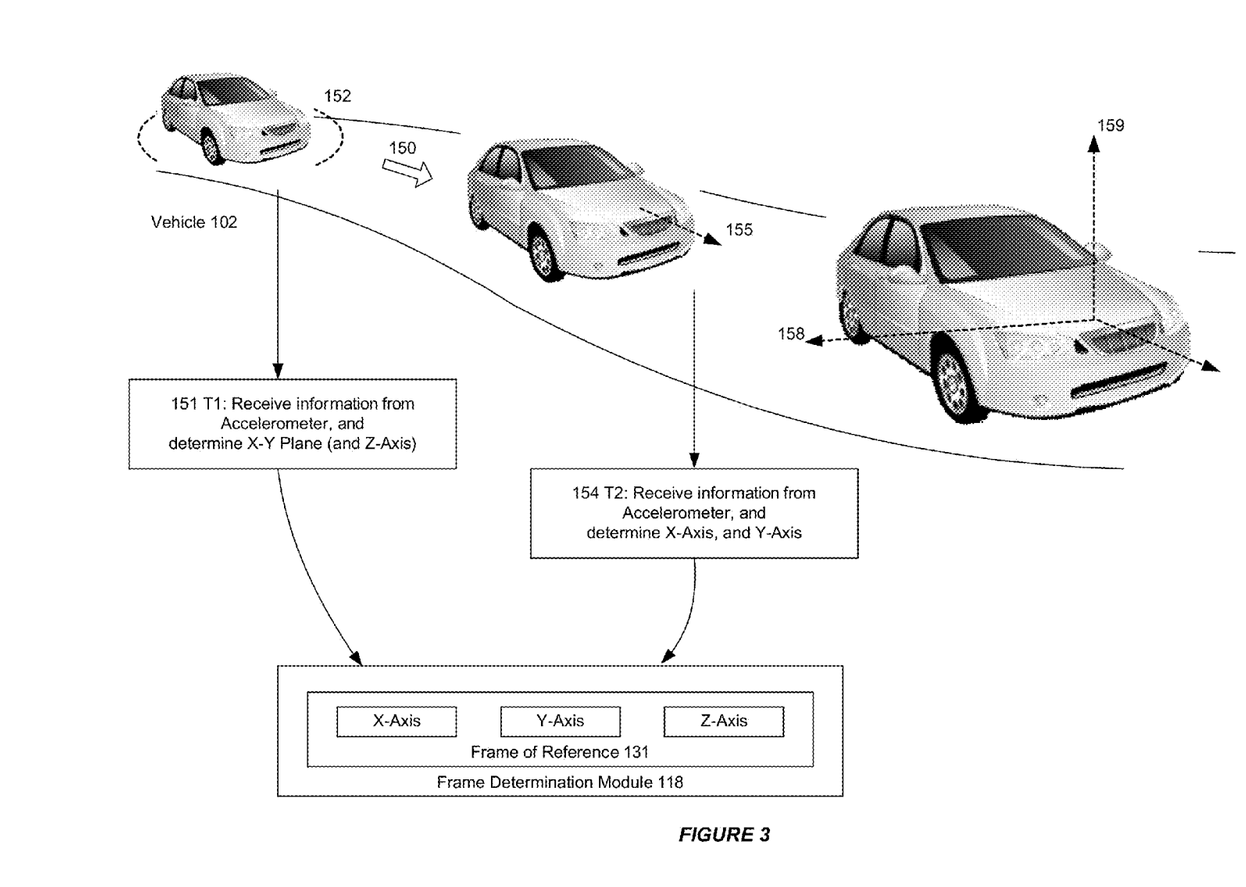
FIG. 3 further illustrates a means for determining a frame of reference, in accordance with an embodiment.

FIG. 3 further illustrates a means for determining a frame of reference, in accordance with an embodiment. As shown in FIG. 3, as the vehicle moves 150, at a time T1, data is received 151 from the accelerometer and from one or more other on-board devices, such as a GPS, gyroscope or additional accelerometer, and is used to determine an x-y plane for the vehicle 152, taking into account that the vehicle generally travels horizontally and by averaging the accelerometer data over a period of time. Given the knowledge of the x-y plane, the vehicle's z-axis can be readily determined in that the z-axis is perpendicular to the x-y plane. At a later time T2, data received 154 from the accelerometer is used to determine a y-axis 155, by averaging the accelerometer data over several braking instances. Given the knowledge of the z and y axes, the vehicle's x-axis can be readily determined.

Figure 4:
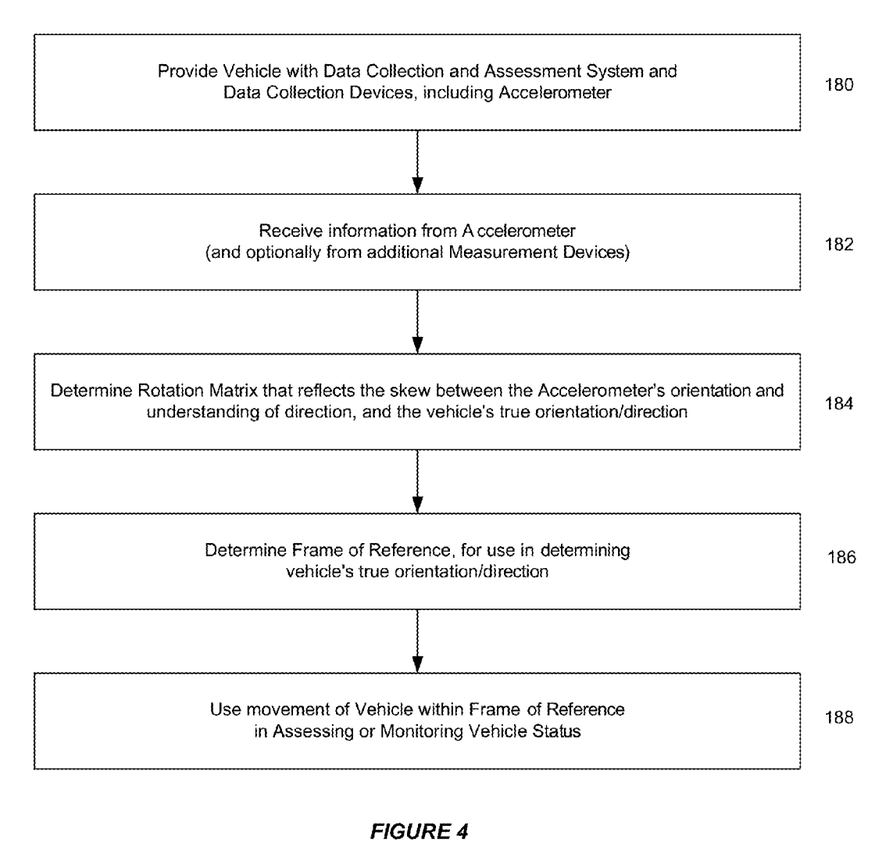
FIG. 4 is a flowchart of a method for determining a frame of reference, in accordance with an embodiment.

FIG. 4 is a flowchart of a method for determining a frame of reference, in accordance with an embodiment. As shown in FIG. 4, at step 180, a vehicle is provided with a data collection and assessment system and data collection devices, including an accelerometer. At step 182, the system receives information from the accelerometer (and optionally from additional measurement devices), and, at step 184, determines a frame of reference, including first an x-y plane; and then an x-axis, y-axis and z-axis. At step 186, the movement of the vehicle within the frame of reference is used in assessing or monitoring the vehicle status.

FIGS. 5-9 are flowcharts of methods for calibrating and using a frame of reference, in accordance with an embodiment. The embodiments shown therein are provided for purposes of illustration, and it will be evident that in accordance with other embodiments, different steps can be used.

As shown in FIGS. 5-9, the rotation matrix skew can be indicated by alpha, beta, and theta components, which represent the necessary correction between the device/accelerometer's orientation and understanding of direction, and the vehicle's true orientation or direction in three-dimensions. In accordance with other embodiments, different ways of representing skew can be used.

Figure 5:
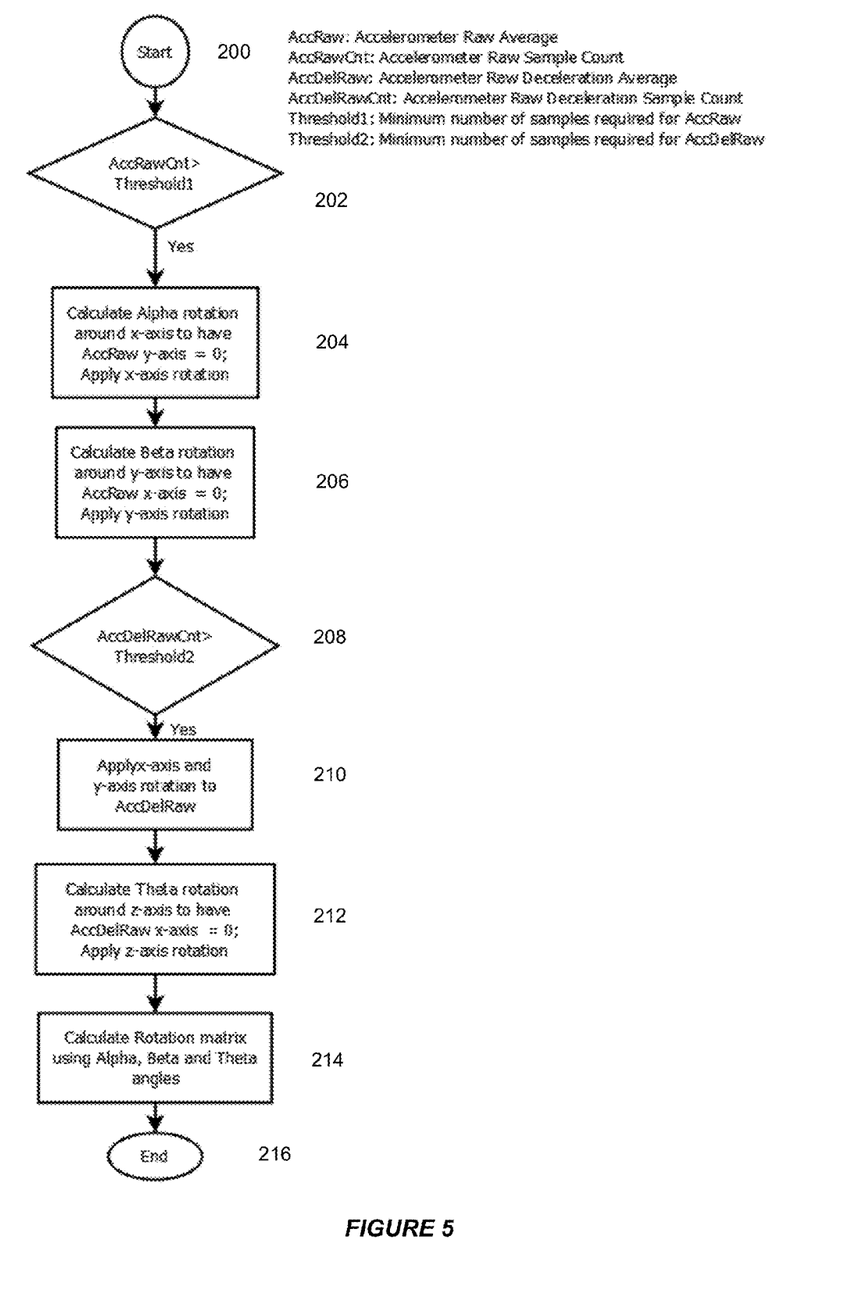
FIG. 5 is a flowchart of a method for calibrating and using a frame of reference, in accordance with an embodiment.

As shown in FIG. 5, in accordance with an embodiment, at start 200, the following variables are initially defined:

AccRaw: Accelerometer Raw Average
AccRawCnt: Accelerometer Raw Sample Count
AccDelRaw: Accelerometer Raw Deceleration Average
AccDelRawCnt: Accelerometer Raw Deceleration Sample Count
Threshold1: Minimum number of samples required for AccRaw
Threshold2: Minimum number of samples required for AccDelRaw At step 202, the system determines whether AccRawCnt>Threshold1. If it is, then, at step 204, a value is calculated for Alpha rotation around the x-axis, to have AccRaw y-axis=0; and to apply x-axis rotation. At step 206, a value is calculated for Beta rotation around the y-axis, to have AccRaw x-axis=0; and to apply y-axis rotation. At step 208, the system determines whether AccRawCnt>Threshold2. If it is, then, at step 210, an x-axis and y-axis rotation is applied to AccDelRaw. At step 212, a value is calculated for Theta rotation around the z-axis, to have AccDelRaw x-axis=0; and to apply z-axis rotation. At step 214, a rotation matrix is calculated using the Alpha, Beta and Theta angles. The process then ends 216.

Figure 6:
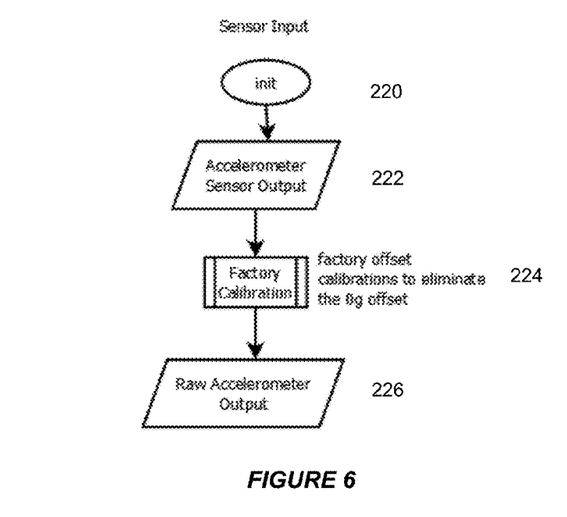
FIG. 6 is a flowchart of a method for calibrating and using a frame of reference, in accordance with an embodiment.

FIG. 6 illustrates a system calibration process in accordance with an embodiment. As shown in FIG. 6, at step 220 the process is initialized. At step 222, the accelerometer output is received. At step 224, the system applies any factory offset calibrations, to eliminate any 0 g offset. At step 226, the raw accelerometer output can then be provided 226.

Figure 7:
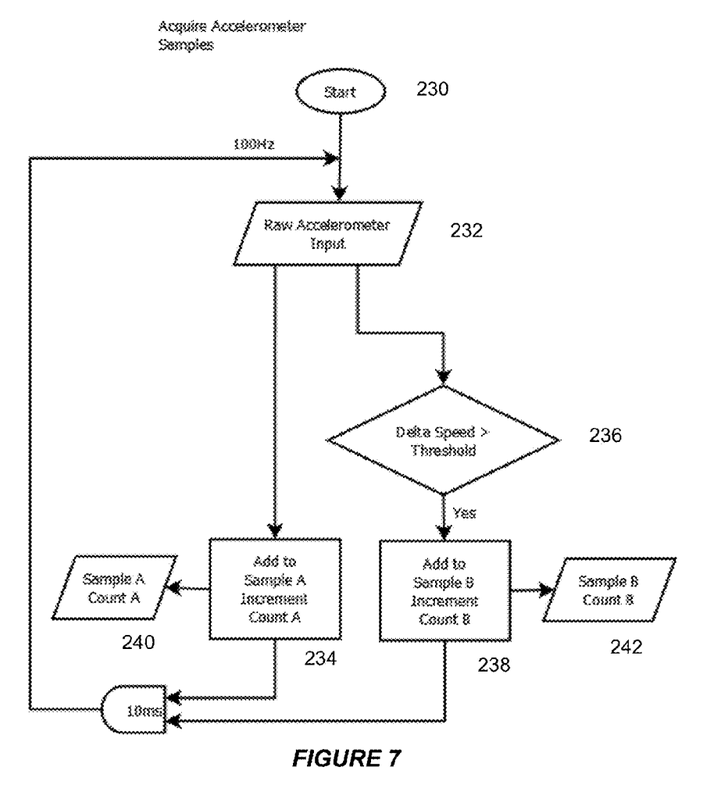
FIG. 7 is a flowchart of a method for calibrating and using a frame of reference, in accordance with an embodiment.
Figure 8:
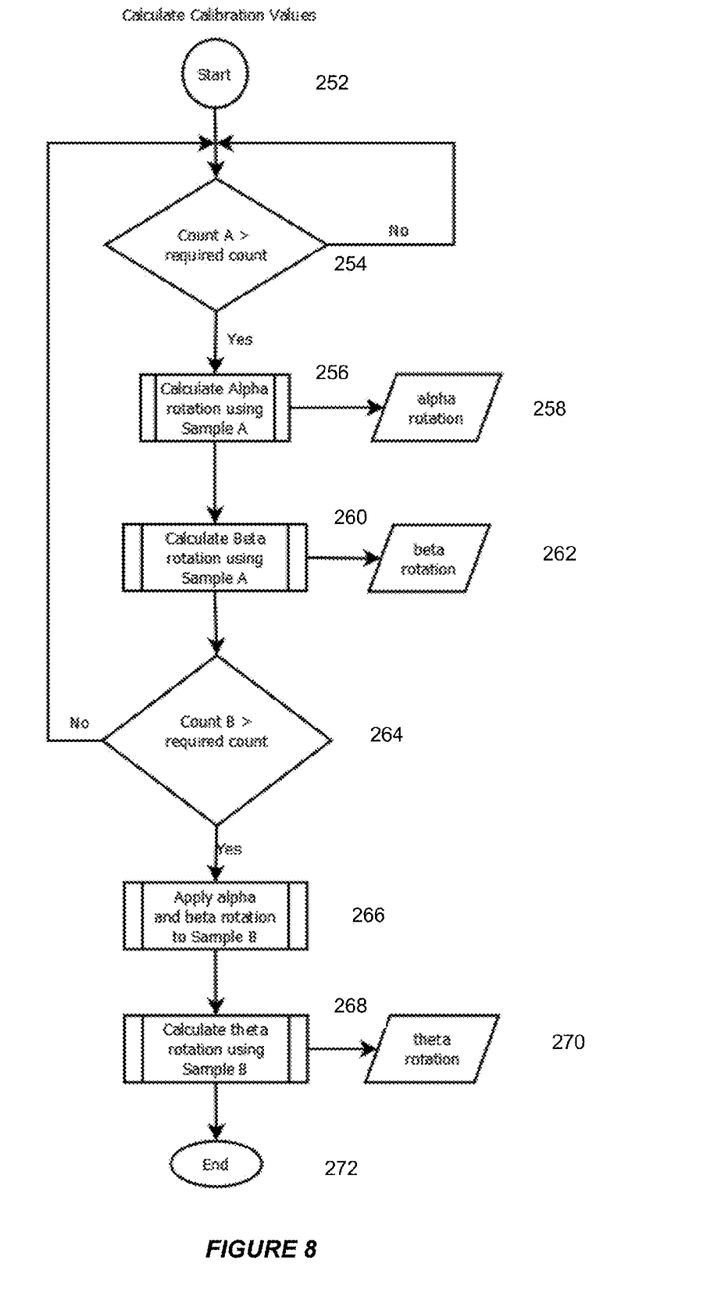
FIG. 8 is a flowchart of a method for calibrating and using a frame of reference, in accordance with an embodiment.

FIGS. 7 and 8 illustrate a data sampling process in accordance with an embodiment. As shown in FIG. 7, the process starts 230 by acquiring accelerometer samples, including raw accelerometer input 232. The input is added both at steps 234, 236 to a sample A, which is incremented, and at step 236 if the acceleration is greater than a threshold value (Delta Speed>Threshold) to a sample B 238 242, which is incremented. The counts can be compared at regular intervals.

As shown in FIG. 8, following start 252, at step 254, Count A is compared to a required count, and if greater, the Alpha rotation is determined 256, 258 using the Sample A, and the Beta rotation is determined 260, 262 using the Sample A. At step 264, Count B is compared to a required count, and if greater, then at step 266 Alpha and Beta rotation are applied to Sample B, and the Theta rotation is determined 268, 270 using the Sample B. The process then ends 272.

Figure 9:
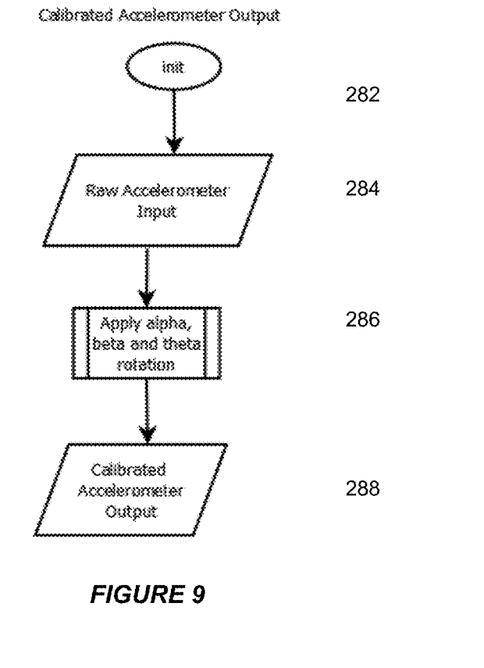
FIG. 9 is a flowchart of a method for calibrating and using a frame of reference, in accordance with an embodiment.

FIG. 9 illustrates a calibrated accelerometer output process in accordance with an embodiment. As shown in FIG. 9, at step 282 the process is initialized. At step 284, the raw accelerometer input is received. At step 286, the system applies the Alpha, Beta and Theta rotations. At step 288, the calibrated accelerometer output can then be provided 226.

The present invention may be conveniently implemented using one or more conventional general purpose or specialized digital computers or microprocessors programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated. For example, although the illustrations provided herein primarily describe embodiments using vehicles, it will be evident that the techniques described herein can be similarly used with, e.g., trains, ships, airplanes, containers, or other moving equipment. It is intended that the scope of the invention be defined by the following claims and their equivalence.

What is claimed is:

1. A system to determine the direction of travel of a vehicle in motion relative to the orientation of an accelerometer fixedly attached within the vehicle, for subsequent use in characterizing motion and assessing or monitoring a status of at least one of the vehicle, other equipment, and a operator thereof, comprising:

a data collection and assessment system configured to collect information from at least the accelerometer; and a frame determination module which receives information comprising accelerometer information from the data collection and assessment system over a period of time and uses this information to determine a rotation matrix that reflects the skew between the orientation of the accelerometer and the direction of travel of the vehicle.

2. The system of claim 1, further comprising a data communication module which enables communication of the collected information, and vehicle motion characterizations and status, to one or more other systems.

3. The system of claim 2, wherein the collected information, and vehicle motion characterizations are used together with pattern matching as part of an operator assessment and monitoring system or service.

4. The system of claim 1, wherein the frame determination module determines the direction of travel of a vehicle relative to the orientation of the accelerometer by sampling the accelerometer data, and first determining averages over a period of time, to determine the moving vehicle or other equipment's x-y plane, and then averaging the accelerometer data over several braking instances to determine an x-axis, y-axis and z-axis for the moving vehicle or other equipment.

5. The system of claim 1, wherein the x-axis, y-axis and z-axis determinations are stored as a rotation matrix, and used to subsequently characterize motions of the moving vehicle or other equipment in three dimensions.

6. The system of claim 1 wherein the data collection and assessment system collects additional information from at least one of a second accelerometer and gyroscope, a gps and other sensors and wherein the frame determination module uses the additional information along with the accelerometer information to characterize motion and assess or monitor.

7. A method to determine the direction of travel of a vehicle in motion, relative to the orientation of an accelerometer fixedly attached within the vehicle, for subsequent use in characterizing motion and assessing or monitoring a status of at least one of the vehicle, other equipment, and a operator thereof, comprising:

sampling or otherwise receiving the accelerometer data over a period of time and using this information to determine a rotation matrix that reflects the skew between the direction of travel of the vehicle and the orientation of the accelerometer.

8. The method of claim 7, further comprising a data communication module which enables communication of the collected information, and vehicle motion characterizations and status, to one or more other systems.

9. The method of claim 8, wherein the collected information, and vehicle motion characterizations are used together with pattern matching as part of an operator assessment and monitoring system or service.

10. The method of claim 7, wherein the direction of travel of the vehicle relative to the orientation of the accelerometer is determined by first determining average acceleration over a period of time, to determine the vehicle or other equipment's x-y plane, and then averaging the accelerometer data over several braking instances to determine an x-axis, y-axis and z-axis for the vehicle or other equipment.

11. The method of claim 7, wherein the x-axis, y-axis and z-axis determinations are stored as a rotation matrix, and used to subsequently characterize motions of the moving vehicle or other equipment in three dimensions.

12. The method of claim 7 wherein additional information is sampled and otherwised received from at least one of a second accelerometer, a gyro, a gps and other sensors and wherein the additional information is used along with accelerometer information to characterize motion and assess or monitor.

13. A non-transitory computer readable medium, including instructions stored thereon which when read and executed by one or more computers cause the one or more computers to perform the steps comprising:

using an accelerometer to collect information as a vehicle or other equipment is moving; and sampling or otherwise receiving the accelerometer data over a period of time and using this information to determine a rotation matrix that reflects the skew between the direction of travel of the vehicle and the orientation of the accelerometer for use in subsequently characterizing motions and status of the vehicle or other equipment in three dimensions.

\* \* \* \* \*